(12) United States Patent
Gardner

(10) Patent No.: US 8,915,010 B1
(45) Date of Patent: Dec. 23, 2014

(54) FLOATING FISHING GEAR HOLDING ASSEMBLY

(76) Inventor: Lance Gardner, Mykka City, FL (US)

(*) Notice: Subject to any disclaimer, the term of this patent is extended or adjusted under 35 U.S.C. 154(b) by 297 days.

(21) Appl. No.: 13/495,412

(22) Filed: Jun. 13, 2012

(51) Int. Cl.
*A01K 97/06* (2006.01)

(52) U.S. Cl.
USPC ......... 43/17.5; 43/4; 43/54.1; 43/55; 220/560

(58) Field of Classification Search
USPC .................. 43/4, 54.1, 55, 17.5; 206/315.11; 220/560; 441/129–131, 136, 43, 67, 441/81, 1, 6
See application file for complete search history.

(56) References Cited

U.S. PATENT DOCUMENTS

| | | | |
|---|---|---|---|
| 844,580 A * | 2/1907 | Cline | 441/81 |
| 856,279 A * | 6/1907 | Moore | 441/43 |
| 1,349,897 A * | 8/1920 | McDonah | 441/43 |
| 2,287,518 A * | 6/1942 | Flynn | 441/43 |
| 2,435,497 A * | 2/1948 | Hajduk | 441/131 |
| 2,823,971 A * | 2/1958 | Hoyt | 312/290 |
| 3,317,097 A * | 5/1967 | Giordano | 224/182 |
| 3,520,008 A * | 7/1970 | Frieder et al. | 441/81 |
| 3,678,611 A * | 7/1972 | Files | 43/26 |
| 3,745,692 A * | 7/1973 | McGee | 43/17.5 |
| 3,780,468 A * | 12/1973 | Maffett | 43/54.1 |
| 4,500,059 A * | 2/1985 | Papizan | 248/205.1 |
| 4,526,414 A * | 7/1985 | Jones | 294/143 |
| 4,638,593 A * | 1/1987 | Garcia | 43/54.1 |
| 4,697,379 A * | 10/1987 | McPhaul | 43/54.1 |
| 4,794,723 A * | 1/1989 | Arnold et al. | 43/55 |
| 4,813,173 A * | 3/1989 | Abbotoy | 43/57.1 |
| 4,890,413 A * | 1/1990 | Nelson et al. | 43/55 |
| 4,905,404 A * | 3/1990 | Pasion et al. | 43/55 |
| 5,022,879 A * | 6/1991 | DiForte | 441/113 |
| 5,163,694 A * | 11/1992 | Reichek | 280/47.26 |
| 5,251,113 A * | 10/1993 | Wagoner et al. | 362/190 |
| 5,402,596 A | 4/1995 | Gillming, Jr. | |
| 5,520,561 A * | 5/1996 | Langenohl | 441/129 |
| 5,605,056 A * | 2/1997 | Brown et al. | 62/457.4 |
| 5,632,113 A * | 5/1997 | Raymond et al. | 43/54.1 |
| 6,014,833 A * | 1/2000 | Benavidez | 43/54.1 |
| 6,053,790 A * | 4/2000 | Langford | 441/129 |
| 6,155,001 A * | 12/2000 | Marin | 43/54.1 |
| 6,269,587 B1 * | 8/2001 | Wallace | 43/54.1 |
| 6,269,589 B1 | 8/2001 | Bouler | |
| 6,364,150 B1 * | 4/2002 | Persinger | 220/735 |
| 6,446,382 B1 * | 9/2002 | Cloutier et al. | 43/54.1 |
| 6,467,779 B1 * | 10/2002 | Mills | 280/47.26 |
| 7,222,743 B1 * | 5/2007 | Wilhelm | 220/560 |
| 7,249,435 B1 * | 7/2007 | Tetenes | 43/44.99 |
| 7,788,843 B2 * | 9/2010 | Boos, Jr. | 43/55 |
| D639,380 S | 6/2011 | Smith et al. | |
| 8,052,020 B1 * | 11/2011 | Wurtz | 224/662 |
| 8,506,339 B2 * | 8/2013 | Fletcher | 441/1 |

(Continued)

*Primary Examiner* — Darren W Ark
*Assistant Examiner* — Morgan T Barlow

(57) ABSTRACT

A fishing gear holding assembly is provided for floating on a water surface to facilitate fishing without having to leave the water. The assembly includes a buoyant support having an outer perimeter wall, a bottom wall, an upper wall, and an inner perimeter wall. The inner perimeter wall defines a well in the support. A box has a base wall and a peripheral wall coupled to and extending upwardly from the base wall. The box is positioned in the well. At least one upright tube is coupled to and positioned in the box. The upright tube is configured for receiving and supporting a fishing rod in an upright position. A plurality of floats is positioned in the well around the box.

14 Claims, 6 Drawing Sheets

(56) References Cited

U.S. PATENT DOCUMENTS

| | | | |
|---|---|---|---|
| 2005/0055869 A1* | 3/2005 | Corso et al. | 43/54.1 |
| 2005/0268527 A1* | 12/2005 | Beech | 43/55 |
| 2007/0051031 A1* | 3/2007 | Allen | 43/54.1 |
| 2007/0249246 A1* | 10/2007 | Neidert et al. | 441/130 |
| 2007/0251137 A1* | 11/2007 | Boos | 43/55 |
| 2008/0026656 A1* | 1/2008 | Zeyger | 441/129 |
| 2008/0110079 A1* | 5/2008 | Jeffries | 43/55 |
| 2008/0307693 A1* | 12/2008 | Wessels | 43/55 |
| 2009/0130930 A1* | 5/2009 | Tanaka et al. | 441/11 |
| 2009/0165358 A1* | 7/2009 | Tough | 43/54.1 |
| 2010/0102065 A1* | 4/2010 | Phelan | 220/560 |
| 2011/0197494 A1* | 8/2011 | Schumacher et al. | 43/54.1 |
| 2012/0052756 A1* | 3/2012 | Axtell | 441/129 |
| 2012/0110890 A1* | 5/2012 | Garrett | 43/55 |

* cited by examiner

US 8,915,010 B1

FLOATING FISHING GEAR HOLDING ASSEMBLY

BACKGROUND OF THE DISCLOSURE

Field of the Disclosure

The disclosure relates to fishing gear holding devices and more particularly pertains to a new fishing gear holding device for supporting various fishing gear on a water surface to facilitate fishing without having to leave the water.

SUMMARY OF THE DISCLOSURE

An embodiment of the disclosure meets the needs presented above by generally comprising a buoyant support having an outer perimeter wall, a bottom wall coupled to and extending inwardly from the outer perimeter wall, an upper wall coupled to and extending inwardly from the outer perimeter wall, and an inner perimeter wall coupled to and extending downwardly from the upper wall. The inner perimeter wall defines a well in the support. A box has a base wall and a peripheral wall coupled to and extending upwardly from the base wall. The box is positioned in the well. At least one upright tube is coupled to and positioned in the box. The upright tube is configured for receiving and supporting a fishing rod in an upright position. A plurality of floats is positioned in the well around the box.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
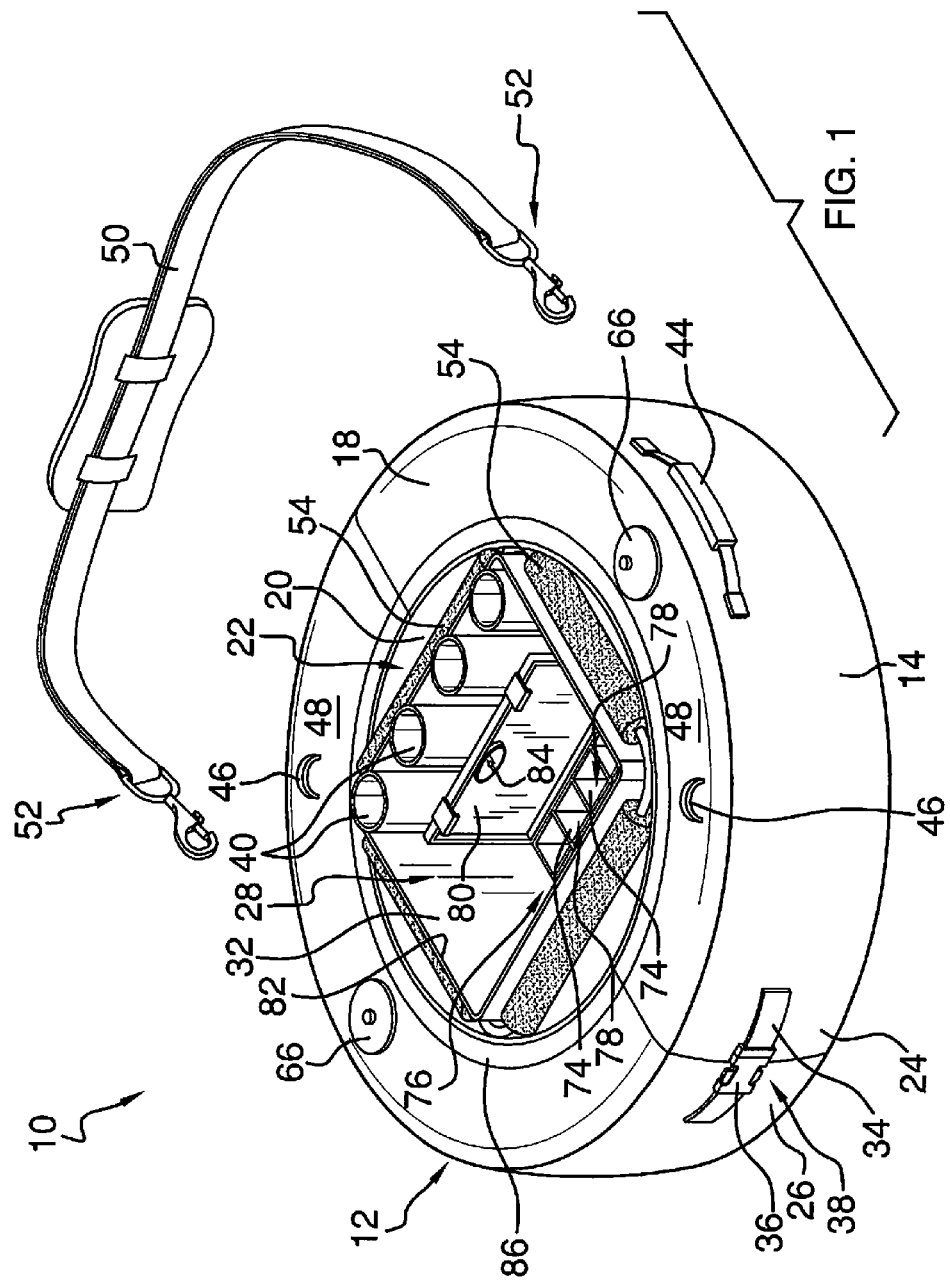
FIG. 1 is a top front side perspective view of a floating fishing gear holding assembly according to an embodiment of the disclosure.
Figure 2:
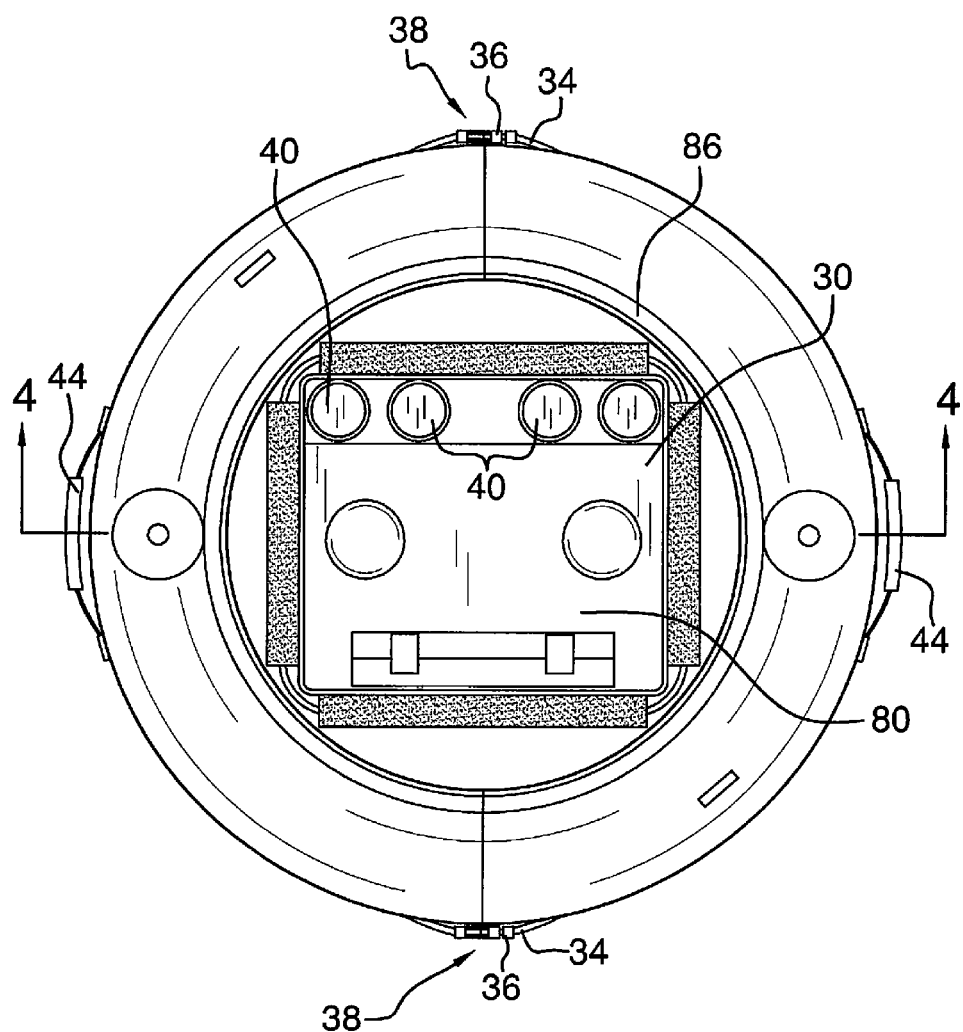
FIG. 2 is a top view of an embodiment of the disclosure.
Figure 3:
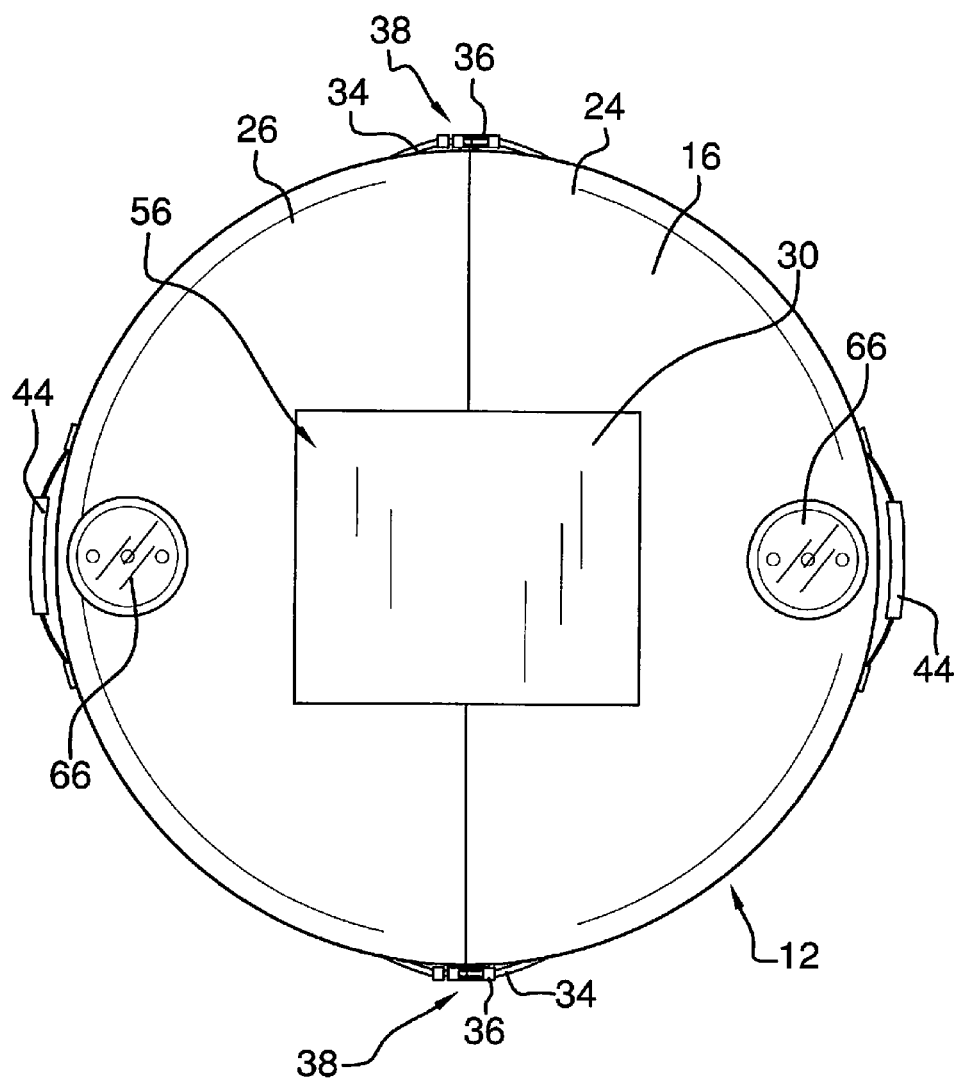
FIG. 3 is a bottom view of an embodiment of the disclosure.

With reference now to the drawings, and in particular to FIGS. 1 through 6 thereof, a new fishing gear holding device embodying the principles and concepts of an embodiment of the disclosure and generally designated by the reference numeral 10 will be described.

As best illustrated in FIGS. 1 through 6, the floating fishing gear holding assembly 10 generally comprises a buoyant support 12 having an outer perimeter wall 14, a bottom wall 16 coupled to and extending inwardly from the outer perimeter wall 14, an upper wall 18 coupled to and extending inwardly from the outer perimeter wall 14, and an inner perimeter wall 20 coupled to and extending downwardly from the upper wall 18. The inner perimeter wall 20 defines a well 22 in the support 12. The support 12 may have a first section 24 separable from a second section 26.

Figure 4:
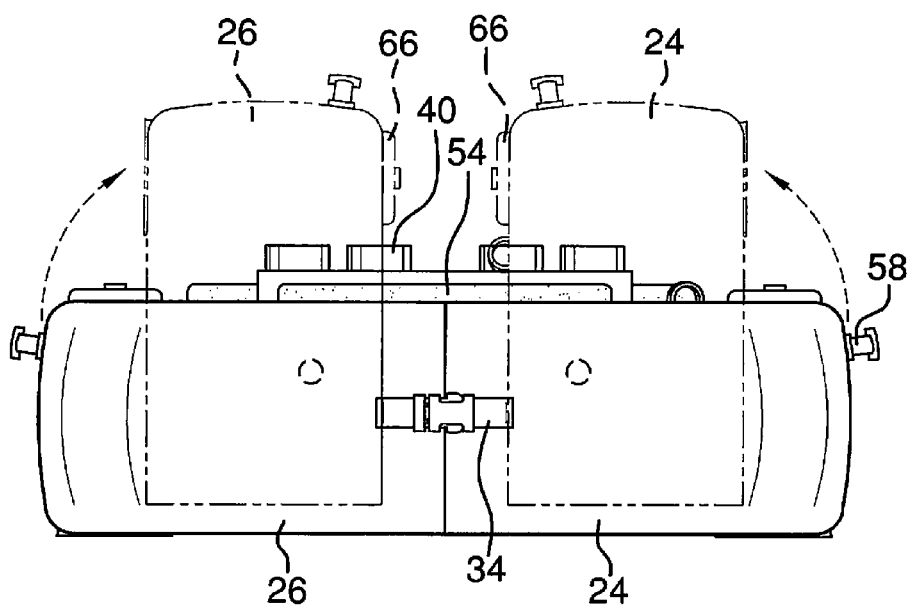
FIG. 4 is a front view of an embodiment of the disclosure.
Figure 5:
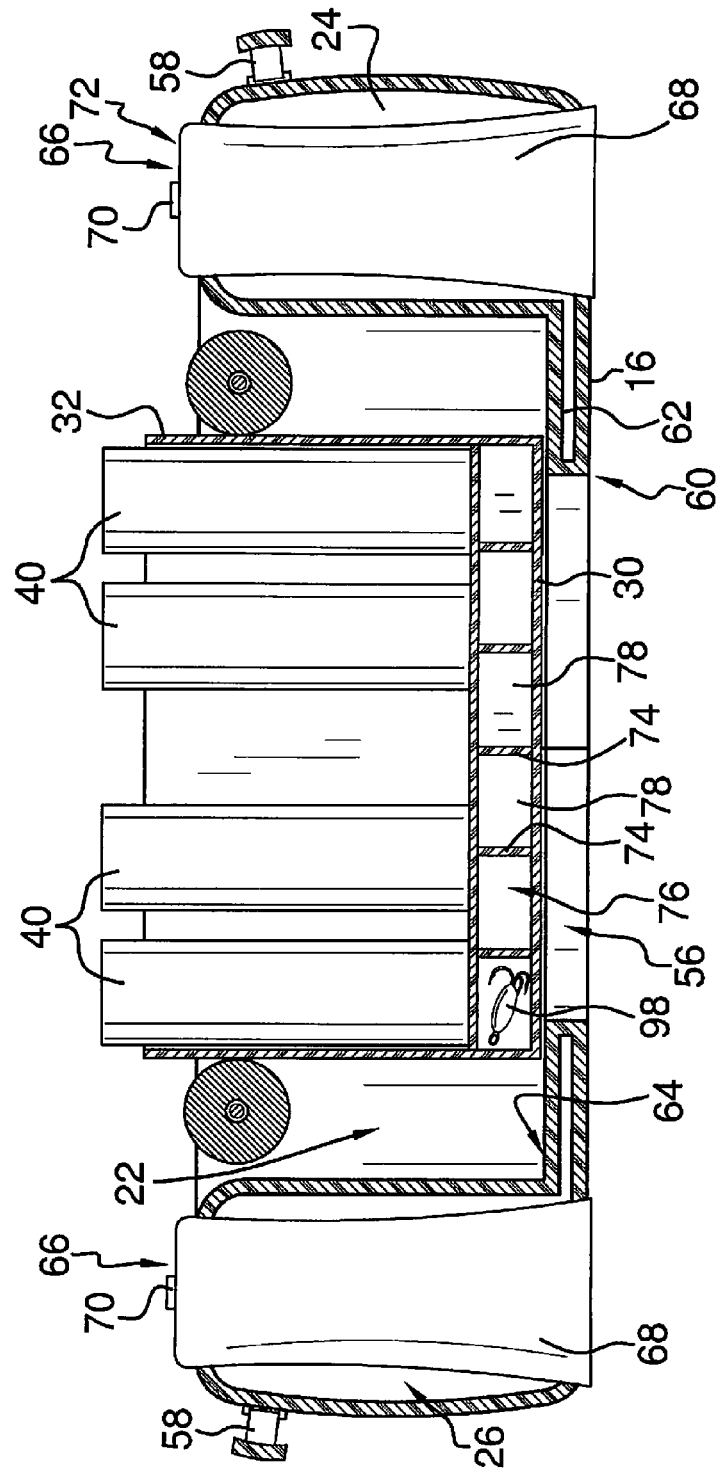
FIG. 5 is a cross-sectional view of an embodiment of the disclosure taken along line 5-5 of FIG. 2.
Figure 6:
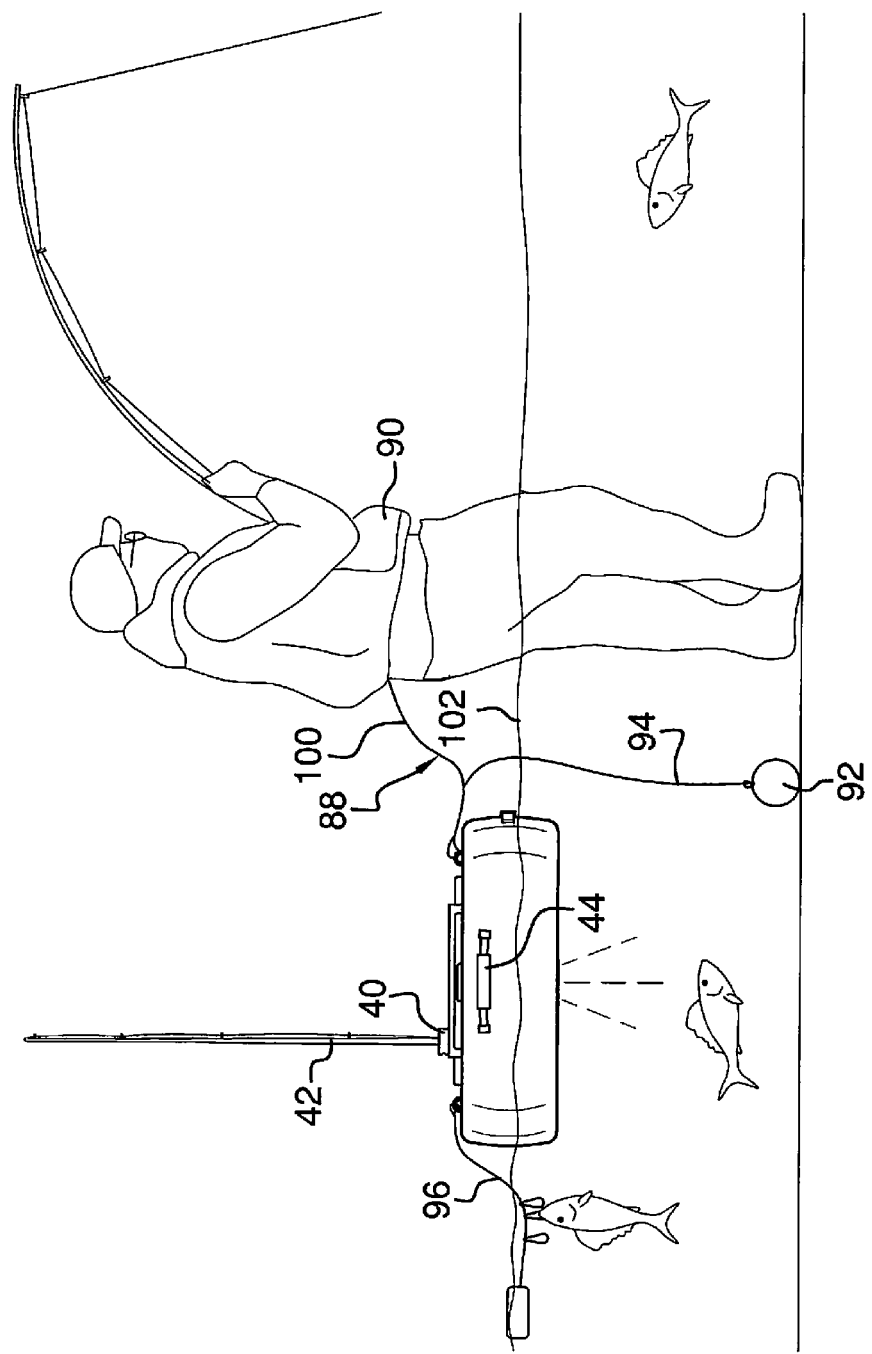
FIG. 6 is a side view of an embodiment of the disclosure in use.

A box 28 has a base wall 30 and a peripheral wall 32 coupled to and extending upwardly from the base wall 30. The box 28 is positioned in the well 22. A pair of bands 34 are provided and coupled to the support 12 securing the first section 24 of the support 12 to the second section 26 of the support 12. A pair of clip assemblies 36 is provided. Each clip assembly 36 is coupled to a medial portion 38 of an associated one of the bands 34 whereby the first section 24 and the second section 26 of the support 12 are releasably coupled together. A pair of handles 44 is coupled to the support 12 with each being coupled to an associated one of the first section 24 and the second section 26. The first section 24 and second section 26 may be pivoted inwardly and carried by the handles 44 as shown in FIG. 4. A pair of loops 46 may also be coupled to a top surface 48 of the support 12 with a strap 50 having opposite ends 52 removably coupled to the loops 46 to facilitate carrying the support 12 when the first section 24 and second section 26 are joined together by the bands 34. The first section 24 and second section 26 may each be inflatable and include a filling tube 58.

A plurality of floats 54 is provided and positioned in the well 22 around the box 28. The floats 54 may be elongated foam tubes having a lengthwise conduit receiving a line which holds the floats 54 together to snugly engage the box 28. An opening 56 extends through the bottom wall 16 of the support 12. The opening 56 extends into the well 22 and facilitates draining of the well 22 when not in use. The bottom wall 16 is structured to form a lip 60 extending inwardly from the inner perimeter wall 20 of the support 12. The lip 60 may also be formed by a lip wall 62 positioned in spaced relationship to the bottom wall 16. The lip 60 defines a bottom 64 of the well 22.

At least one downwardly directed light assembly 66 is coupled to the support 12. There may be two such light assemblies 66 with each being coupled to an associated one of the first section 24 and the second section 26 as described below. The downwardly directed light assembly 66 has a housing 68 extending between and through the bottom wall 16 and the upper wall 18 of the support 12. The downwardly directed light assembly 66 includes an activation switch 70 coupled to an upper portion 72 of the housing 68 whereby the activation switch 70 is configured to be accessible above a water surface 102 on which the support 12 floats. The light assembly 66 may provide a light emitting diode to produce the light which will illuminate an area below the support 12.

At least one upright tube 40 is coupled to and positioned in the box 28. Each upright tube 40 is configured for receiving and supporting a fishing rod 42 in an upright position. A plurality of interior walls 74 is coupled to the box 28. The interior walls 74 extend across a bottom portion 76 of the box 28 defining a plurality of compartments 78. A lid 80 is pivotally coupled to the box 28. The lid 80 selectively covers the compartments 78. The lid 80 is spaced from a top edge 82 of the box 28 to permit placement of additional fishing related items on top of the lid 80 and within the box 28. A box light 84 is coupled to the lid 80. The box light 84 selectively illuminates the compartments 78 while the lid 80 is open. The box light 84 may also be provided in the form of a light emitting diode.

To enhance use of the assembly 10 while fishing in low light a luminous material 86 may be coupled to the top surface 48 of the support 12. The material 86 may form a ring around the top surface 48. A tether line 88 is coupled to and extends from the support 12. The tether line 88 has a first section 100 configured for coupling to a person 90. An anchor 92 is coupled to a second section 94 of the tether line 88. The anchor 92 is configured to inhibit movement of the support 12 on the water surface 102. A stringer line 96 may be coupled to the support 12 to hold caught fish.

In use, fishing tackle 98 is stored in the compartments 78 of the box 28. The support 12 is assembled into a ring shape by coupling the first section 24 and second section 26 together. The box 28 and floats 54 are positioned in the well 22. Fishing rods 42 may be stored in the tubes 40 as desired. The light assemblies 66 may be illuminated as desired. Additional items may be stored in the box 28 on top of the lid 80 while fishing.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A fishing gear holding assembly comprising:
   a buoyant support having an outer perimeter wall, a bottom wall coupled to and extending inwardly from said outer perimeter wall, an upper wall coupled to and extending inwardly from said outer perimeter wall, and an inner perimeter wall coupled to and extending downwardly from said upper wall, said inner perimeter wall defining a well in said support;
   a box having a base wall and a peripheral wall coupled to and extending upwardly from said base wall, said box being positioned in said well;
   at least one upright tube coupled to and positioned in said box, said upright tube being configured for receiving and supporting a fishing rod in an upright position;
   a plurality of floats, said floats being positioned in said well around said box;
   at least one downwardly directed light assembly coupled to said support, said downwardly directed light assembly having a housing extending through said bottom wall of said support and being directed downwardly from said support, said downwardly directed light assembly having a housing extending through said bottom wall of said support and being directed downwardly from said support, said housing containing a light source therein.

2. The assembly of claim 1, further comprising:
   said support having a first section and a second section; and
   a pair of bands, said bands coupling said first section of said support to said second section of said support.

3. The assembly of claim 2, further including a pair of clip assemblies, each clip assembly being coupled to a medial portion of an associated one of said bands whereby said first section and said second section of said support are releasably coupled together.

4. The assembly of claim 1, wherein said downwardly directed light assembly through said upper wall of said support, said downwardly directed light assembly including an activation switch coupled to an upper portion of said housing whereby said activation switch is configured to be accessible above a water surface on which said support floats.

5. The assembly of claim 1, further including a pair of handles coupled to said support.

6. The assembly of claim 1, further comprising:
   a pair of loops coupled to a top surface of said support; and
   a strap having opposite ends removably coupled to said loops.

7. The assembly of claim 1, further including an opening extending through said bottom wall of said support, said opening extending into said well.

8. The assembly of claim 7, further including a lip extending inwardly from said inner perimeter wall of said support, said lip defining a bottom of said well.

9. The assembly of claim 1, further comprising:
   a plurality of interior walls coupled to said box, said interior walls extending across a bottom portion of said box defining a plurality of compartments; and
   a lid pivotally coupled to said box, said lid selectively covering said compartments.

10. The assembly of claim 9, further including a box light coupled to said lid, said box light selectively illuminating said compartments.

11. The assembly of claim 1, further including a luminous material coupled to a top surface of said support.

12. The assembly of claim 1, further including a tether line coupled to and extending from said support, said tether line having a first section configured for coupling to a person.

13. The assembly of claim 12, further including an anchor coupled to a second section of said tether line, said anchor being configured to inhibit movement of said support on a water surface.

14. A fishing gear holding assembly comprising:
   a buoyant support having an outer perimeter wall, a bottom wall coupled to and extending inwardly from said outer perimeter wall, an upper wall coupled to and extending inwardly from said outer perimeter wall, and an inner perimeter wall coupled to and extending downwardly from said upper wall, said inner perimeter wall defining a well in said support, said support having a first section and a second section;
   a box having a base wall and a peripheral wall coupled to and extending upwardly from said base wall, said box being positioned in said well;
   at least one upright tube coupled to and positioned in said box, said upright tube being configured for receiving and supporting a fishing rod in an upright position;
   a plurality of floats, said floats being positioned in said well around said box;
   a pair of bands, said bands coupling said first section of said support to said second section of said support;
   a pair of clip assemblies, each clip assembly being coupled to a medial portion of an associated one of said bands whereby said first section and said second section of said support are releasably coupled together;
   at least one downwardly directed light assembly coupled to said support, said downwardly directed light assembly having a housing extending between and through said bottom wall and said upper wall of said support, said downwardly directed light assembly including an activation switch coupled to an upper portion of said housing whereby said activation switch is configured to be accessible above a water surface on which said support floats;

a pair of handles coupled to said support;

a pair of loops coupled to a top surface of said support;

a strap having opposite ends removably coupled to said loops;

an opening extending through said bottom wall of said support, said opening extending into said well;

a lip extending inwardly from said inner perimeter wall of said support, said lip defining a bottom of said well;

a plurality of interior walls coupled to said box, said interior walls extending across a bottom portion of said box defining a plurality of compartments;

a lid pivotally coupled to said box, said lid selectively covering said compartments;

a box light coupled to said lid, said box light selectively illuminating said compartments;

a luminous material coupled to a top surface of said support;

a tether line coupled to and extending from said support, said tether line having a first section configured for coupling to a person; and an anchor coupled to a second section of said tether line, said anchor being configured to inhibit movement of said support on a water surface.

\* \* \* \* \*